United States Patent [19]
Lynch

[11] Patent Number: 5,819,067
[45] Date of Patent: *Oct. 6, 1998

[54] COMPUTER SYSTEM CONFIGURED TO TRANSLATE A COMPUTER PROGRAM INTO A SECOND COMPUTER PROGRAM PRIOR TO EXECUTING THE COMPUTER PROGRAM

[75] Inventor: Thomas W. Lynch, Austin, Tex.

[73] Assignee: Advanced Micro Devices, Inc., Sunnyvale, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 605,875

[22] Filed: Feb. 23, 1996

[51] Int. Cl.⁶ ..................................................... G06F 9/40
[52] U.S. Cl. ........................ 395/500; 395/568; 395/705
[58] Field of Search .................................. 395/500, 705, 395/707, 700, 568

[56] References Cited

U.S. PATENT DOCUMENTS

| | | | |
|---|---|---|---|
| 4,388,682 | 6/1983 | Eldridge | 364/200 |
| 4,638,423 | 1/1987 | Ballard | 364/200 |
| 5,167,023 | 11/1992 | de Nicolas et al. | 395/375 |
| 5,247,678 | 9/1993 | Littleton | 395/700 |
| 5,301,302 | 4/1994 | Blackard et al. | 395/500 |
| 5,313,614 | 5/1994 | Goettelmann et al. | 395/500 |
| 5,390,332 | 2/1995 | Golson | 395/725 |
| 5,406,644 | 4/1995 | MacGregor | 395/500 |
| 5,471,599 | 11/1995 | Brodnax et al. | 395/412 |
| 5,539,896 | 7/1996 | Lisle | 395/477 |
| 5,551,039 | 8/1996 | Weinberg et al. | 395/700 |
| 5,560,013 | 9/1996 | Scalzi | 395/700 |
| 5,598,560 | 1/1997 | Benson | 395/707 |

FOREIGN PATENT DOCUMENTS 0 737 914  10/1996  European Pat. Off. ........ G06F 9/318

OTHER PUBLICATIONS

IBM Technical Disclosure Bulletin entitled "System/370 Emulator Assist Processor for a Reduced Instruction Set Computer," vol. 30, No. 10, Mar. 1988, Armonk, NY, US, pp. 308–309.

International Search Report for PCT/US 96/19583 dated Jun. 26, 1997.

Thompson, Tom, "An Alpha in PC Clothing," BYTE, Feb. 1996, pp. 195–196.

Johnson, Mike, *Superscalar Microprocessor Design*, Prentice Hall, Englewood Cliffs, NJ, 1991, pp. 261–272.

*Primary Examiner*—Kevin J. Teska
*Assistant Examiner*—A. S. Roberts
*Attorney, Agent, or Firm*—Conley, Rose & Tayon; B. Noel Kivlin

[57] ABSTRACT

A computer system is provided which includes at least two microprocessors. The first microprocessor is configured to translate instructions from an original computer program coded in a first instruction set to a translated computer program coded in a second instruction set. The second microprocessor is configured to execute the translated program. In one particular embodiment, the original program is coded in the x86 instruction set and the translated program is coded in the ADSP 2171 instruction set. Instead of manually performing the translation, the translation is automatically performed by the computer system upon invocation of the original computer program. Those computer programs which may be more efficiently executed by the second microprocessor may be translated into the instruction set executed by the second microprocessor. In one embodiment, the translation of the computer program is performed in page-sized portions. The first microprocessor translates a first page of the original computer program. While the first microprocessor translates a second page of the original computer program, the second microprocessor begins execution of the first page of translated instructions.

16 Claims, 4 Drawing Sheets

COMPUTER SYSTEM CONFIGURED TO TRANSLATE A COMPUTER PROGRAM INTO A SECOND COMPUTER PROGRAM PRIOR TO EXECUTING THE COMPUTER PROGRAM

BACKGROUND OF THE INVENTION

1. Field of the Invention

This invention relates to the field of computer systems and, more particularly, to a computer system having a first microprocessor configured to translate a first computer program to a second computer program. The computer system also includes a second microprocessor configured to execute the second computer program.

2. Description of the Relevant Art

Microprocessors are an integral part of computer systems, generally controlling other devices within the computer system. The performance of the computer system is often in large part dictated by the performance of the microprocessors included within the system. As used herein, the term microprocessor refers to an integrated circuit configured to execute instructions from an instruction set and to interface to other devices in a computer system in order to convey actions required by the instructions being executed. Exemplary microprocessors are general purpose microprocessors such as x86 microprocessors which control the entire computer system, microcontrollers often included within devices in a computer system to perform specific processing functions unique to the devices, and digital signal processors optimized for performing signal processing functions.

A sequence of instructions (i.e. a computer program) executed by the microprocessor defines the operations to be performed by the computer system, as well as the order of those operations. An instruction set comprises a plurality of instructions which a microprocessor is configured to execute. Each instruction has a particular encoding of bits which uniquely identifies the instruction within the instruction set. The microprocessor includes circuitry configured to recognize each instruction and perform operations defined for that instruction. Instruction sets are generally classified as fixed length instruction sets or variable length instructions sets. In fixed length instruction sets, each instruction is represented by a set number of bits. The set number of bits is equal for each instruction within the instruction set. In variable length instruction sets, each instruction is specified by a variable number of bits.

Due to its widespread acceptance in the computer industry, the x86 instruction set is a popular instruction set in which many computer programs are coded. Unfortunately, many computer programs may be more efficiently coded in a DSP instruction set such as the instruction set employed by the ADSP 2171 available from Analog Devices, Inc. of Norwood, Mass. Computer programs which perform complex mathematical operations may be particularly suitable for coding in a DSP instruction set. Even more particularly suitable for a DSP instruction set are computer programs which perform mathematical algorithms such as correlation, convolution, finite impulse response (FIR) filters, infinite impulse response (IIR) filters, Fast Fourier Transforms (FFTs), matrix computations, and inner products, among other operations.

Manually converting a computer program from the x86 instruction set to a DSP instruction set may require a large and expensive investment of manpower. A less expensive means of translating a computer program from one instruction set to another is desired.

SUMMARY OF THE INVENTION

The problems outlined above are in large part solved by a computer system in accordance with the present invention. The computer system includes at least two microprocessors. The first microprocessor is configured to translate instructions from an original computer program coded in a first instruction set to a translated computer program coded in a second instruction set. The second microprocessor is configured to execute the translated program. In one particular embodiment, the original program is coded in the x86 instruction set and the translated program is coded in the ADSP 2171 instruction set. Advantageously, the expense of translating from the original computer program to the translated computer program may be reduced. Instead of manually performing the translation, the translation is automatically performed by the computer system upon invocation of the original computer program. Due to the decreased expense of translating computer programs, those computer programs which may be more efficiently executed by the second microprocessor may be translated. The computer system may therefore achieve increased performance when executing those computer programs.

In one embodiment, the translation of the computer program is performed in page-sized portions. The first microprocessor translates a first page of the original computer program. While the first microprocessor translates a second page of the original computer program, the second microprocessor begins execution of the first page of translated instructions. Advantageously, original computer program translation may occur concurrently with translated computer program execution. Performance may be increased over embodiments which perform the translation and execution tasks serially.

In one particular embodiment, the first and second microprocessors and a buffer are integrated onto a single semiconductor substrate. The first microprocessor (which may be a simpler unit than the second microprocessor) translates instructions and stores them into the buffer. The second microprocessor executes instructions from the buffer. Computer system costs may be decreased if the microprocessors and buffer are configured upon the same substrate. Additionally, communication between the microprocessors and the buffer may be substantially faster due to the lower capacitance of substrate interconnect as opposed to the board interconnect used between discrete devices.

Broadly speaking, the present invention contemplates a computer system comprising a bus, a first microprocessor coupled to the bus, and a second microprocessor coupled to the bus. The first microprocessor is configured to translate at least a portion of a first computer program coded in a first instruction set into at least a portion of a second computer program coded in a second instruction set. The second instruction set is different from the first instruction set. The second microprocessor is configured to execute the second computer program.

The present invention further contemplates a method for executing a first computer program coded in a first instruction set within a computer system, comprising several steps. The first computer program is translated into a second computer program coded in a second instruction set. A first microprocessor within the computer system is configured to perform the translation. The second computer program is executed upon a second microprocessor within the computer system.

BRIEF DESCRIPTION OF THE DRAWINGS

Other objects and advantages of the invention will become apparent upon reading the following detailed description and upon reference to the accompanying drawings in which.

Figure 1:
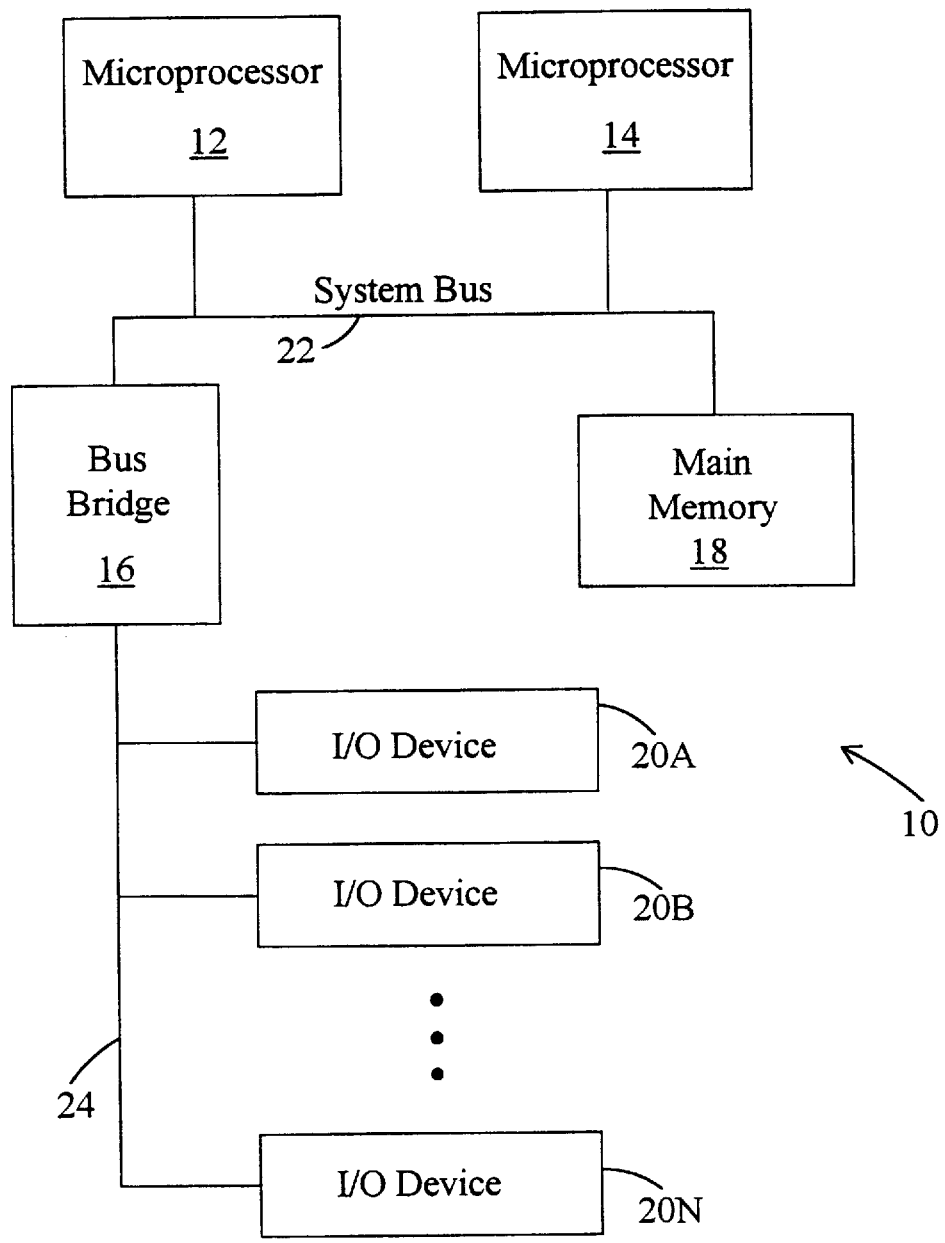
FIG. 1 is a block diagram of a first embodiment of a computer system including a pair of microprocessors.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, one embodiment of a computer system 10 is shown. Computer system 10 includes a first microprocessor 12, a second microprocessor 14, a bus bridge 16, a main memory 18, and a plurality of input/output (I/O) devices 20A–20N (collectively referred to as I/O devices 20). A system bus 22 couples first microprocessor 12, second microprocessor 14, bus bridge 16, and main memory 18. I/O devices 20A–20N are coupled to bus bridge 16 via an I/O bus 24.

Generally speaking, first microprocessor 12 is configured to translate an original computer program coded in a first instruction set into a translated computer program coded in a second instruction set. Second microprocessor 14 is configured to execute the second instruction set. The original computer program is stored in main memory 18. The original computer program may be transferred into main memory 18 from an I/O device 20 when a user of computer system 10 attempts to execute the original computer program, for example. First microprocessor 12 transfers (or reads) the original computer program from main memory 18 and translates the original computer program into the translated computer program. First microprocessor 12 translates the original computer program a portion at a time, and then stores the translated portion such that second microprocessor 14 may access it. In this manner second microprocessor 14 may begin execution of the translated computer program while first microprocessor 12 translates subsequent portions of the original computer program. Advantageously, the original computer program is translated by computer system 10 while the translated computer program is executed. Manpower need not be invested in translating the original computer program from one instruction set to another.

Another advantage of translating the original computer program into the translated computer program involves the dissimilar goals of program transmission and program execution. For transmitting and storing a program, the most compact possible expression of the program is desired. The compact size occupies less storage and may be transmitted (from a hard disk storage to main memory 18 and from main memory 18 to the microprocessors) efficiently. For example, a variable byte length instruction set such as the x86 instruction set may be suitable for program storage and transmission (i.e. for the original computer program). Each instruction occupies only those bytes which are necessary to specify the instruction.

Conversely, computer program execution may be most efficient if the instructions are simple to detect and decode. Since simpler logic may require fewer cascaded logic levels, fewer pipeline stages and/or higher clock frequencies may be achieved. Variable byte length instructions are typically difficult to detect and decode. One instruction must be at least partially decoded prior to detection of the subsequent instruction. Fixed length instruction sets (in which each instruction occupies the same number of bytes as each other instruction) may be suitable for computer program execution (i.e. for the translated computer program). Because each instruction is fixed length, knowledge of the location of the first instruction implies the location of each subsequent instruction. Additionally, opcode and operand fields are typically located in the same position within each instruction, further simplifying instruction decode. By employing the translation scheme described herein, the original computer program may be coded using an instruction set which is ideal for program storage and transmission. Meanwhile, the translated computer program may be coded using another instruction set which is ideal for program execution.

The size of the portions processed by first microprocessor 12 may vary, and comprises a page in one embodiment. A page is a predefined number of consecutive memory locations within main memory 18. The page is aligned to a page boundary, such that an offset of a byte within the page may be concatenated with high order address bits to form the address of the byte. In other words, only a number of low order bits of the address are varied to access each of the consecutive memory locations. For example, a page may include 4 kilobytes of consecutive memory locations. The 4 kilobyte page begins at an address having twelve low order zeros, such that the upper order 20 bits (of a 32 bit address) are common to all bytes within the page. Other portion sizes may be employed by other embodiments. By translating the program in portions, second microprocessor 14 may begin execution of the translated program prior to completion of the translation. Advantageously, translated program execution and program translation may be performed concurrently.

In the embodiment shown, first microprocessor 12 stores portions of the translated computer program into main memory 18. Second microprocessor 14 reads the translated computer program from main memory 18. A particular memory location within main memory 18 may be defined for communicating when a particular page is stored in main memory 18. First microprocessor 12 translates a page of instructions, stores them into main memory 18, and stores a value indicative of the page into the particular memory location. Pages of instructions in the translated program are thereby communicated between first microprocessor 12 and second microprocessor 14. It is noted that data used by second microprocessor 14 is stored in main memory 18 and accessed by second microprocessor 14 as needed.

In one embodiment, the original program is coded in the x86 instruction set and the translated program is coded in the ADSP 2171 instruction set. First microprocessor 12 may be designed to execute any instruction set, but is designed to execute the x86 instruction set in one embodiment. In particular, first microprocessor 12 need not execute the instruction set in which the original program is coded. Similarly, second microprocessor 14 may be configured to execute any instruction set, but is designed to execute the ADSP 2171 instruction set in one embodiment.

Bus bridge 16 is provided to assist in communications between I/O devices 20 and devices coupled to system bus 22. I/O devices 20 typically require longer bus clock cycles than first microprocessor 12, second microprocessor 14, and other devices coupled to system bus 22. Therefore, bus bridge 16 provides a buffer between system bus 22 and input/output bus 24. Additionally, bus bridge 16 translates transactions from one bus protocol to another. In one embodiment, input/output bus 24 is an Enhanced Industry Standard Architecture (EISA) bus and bus bridge 16 translates from the system bus protocol to the EISA bus protocol. In another embodiment, input/output bus 24 is a Peripheral Component Interconnect (PCI) bus and bus bridge 16 translates from the system bus protocol to the PCI bus protocol. It is noted that many variations of system bus protocols exist. First microprocessor 12 and second microprocessor 14 may employ any suitable system bus protocol.

I/O devices 20 provide an interface between computer system 10 and other devices external to the computer system. Exemplary I/O devices include a modem, a serial or parallel port, a sound card, etc. I/O devices 20 may also be referred to as peripheral devices. Main memory 18 stores data and instructions for use by first microprocessor 12 and second microprocessor 14. In particular, main memory 18 is configured to store the original computer program and the translated computer program. In one embodiment, main memory 20 includes at least one Dynamic Random Access Memory (DRAM) chip and a DRAM memory controller.

It is noted that although computer system 10 as shown in FIG. 1 includes two microprocessors, other embodiments of computer system 10 may included multiple microprocessors similar to microprocessor 12 and/or multiple microprocessors similar to microprocessor 14. It is further noted that the discussion herein may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value.

Figure 2:
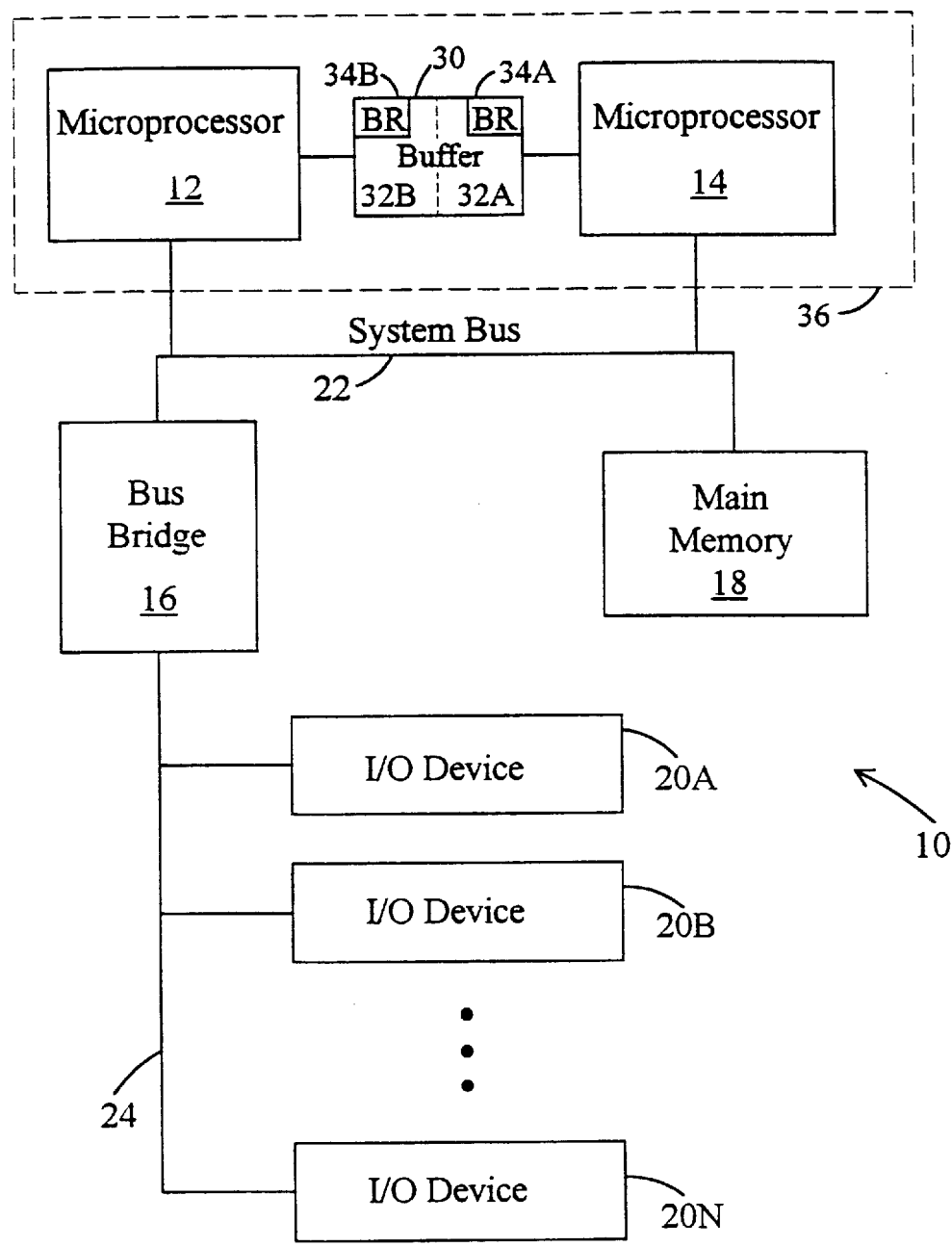
FIG. 2 is a block diagram of a second embodiment of a computer system including a pair of microprocessors and a buffer coupled between the microprocessors.

Turning next to FIG. 2, another embodiment of computer system 10 is shown. Like numbered elements in FIGS. 1 and 2 are similar. In addition to the elements shown in FIG. 1, the embodiment shown in FIG. 2 includes a buffer 30. Buffer 30 is used to store portions of the translated computer program, and is coupled between first microprocessor 12 and second microprocessor 14. First microprocessor 12 is coupled to store portions of the translated computer program into buffer 30, and second microprocessor 14 is coupled to read portions of the translated computer program from buffer 30.

In order to allow for first microprocessor 12 to continue translation with subsequent portions of the original computer program while second microprocessor 14 executes a portion of the translated computer program, buffer 30 is divided into two symmetrical sections in one embodiment. Each section includes a page of storage and an indication that the page of storage is valid (i.e. that first microprocessor 12 has stored the page of storage into buffer 30). The pages of storage are indicated as reference numerals 32A and 32B, while the corresponding valid indications are indicated as reference numerals 34A and 34B. In one embodiment, each valid indication comprises a bit indicative, when set, that the corresponding page of storage is valid.

The configuration of buffer 30 as shown in FIG. 2 is often referred to as a ping-pong buffer. First microprocessor 12 may store a page of instructions into page of storage 32A. While second microprocessor 14 reads and executes the instructions within page of storage 32A, first microprocessor 12 stores a subsequent page of instructions into page of storage 32B. When second microprocessor 14 completes the instructions stored in page of storage 32A, second microprocessor 14 begins executing instructions from page of storage 32B and first microprocessor 12 begins storing instructions into page of storage 32A. Hence, first microprocessor 12 alternately stores instructions into page of storages 32. Second microprocessor 14 alternately reads from the page of storage 32 opposite to the page of storage being stored to by first microprocessor 12. Therefore, each microprocessor is seen to "ping-pong" from one page of storage 32 to the other.

In the embodiment of FIG. 2, second microprocessor 14 is configured to detect when the instructions being executed from one of page of storages 32 have been exhausted. Upon exhaustion of the instructions, second microprocessor 14 checks the valid indication 34 of the alternate page of storage 32 prior to reading instructions from the alternate page of storage 32. If the valid indication 34 is not yet set, then second microprocessor 14 waits for the valid indication 34 to be set before reading instructions. Second microprocessor 14 resets the valid indication 34 upon exhausting the instructions within the corresponding page of storage 32. In this manner, first microprocessor 12 may determine when it may begin storing instructions into a page of storage 32 (i.e. the corresponding valid indication 34 is reset before first microprocessor 12 begins storing instructions into the page of storage 32).

It is noted that first microprocessor 12, second microprocessor 14, and buffer 30 may be integrated onto a single substrate (as indicated by dashed enclosure 36 in FIG. 2). First microprocessor 12 may be a simple processor configured only to translate instructions from the original computer program to the translated computer program. In this manner, computer system 10 may include fewer discrete devices. Cost may be advantageously decreased in the resulting computer system. Still further, communication between microprocessors 12 and 14 and buffer 30 may be performed at the typically higher clock rate of internal circuitry, as opposed to the typically lower clock rate of system bus 22.

Figure 3:
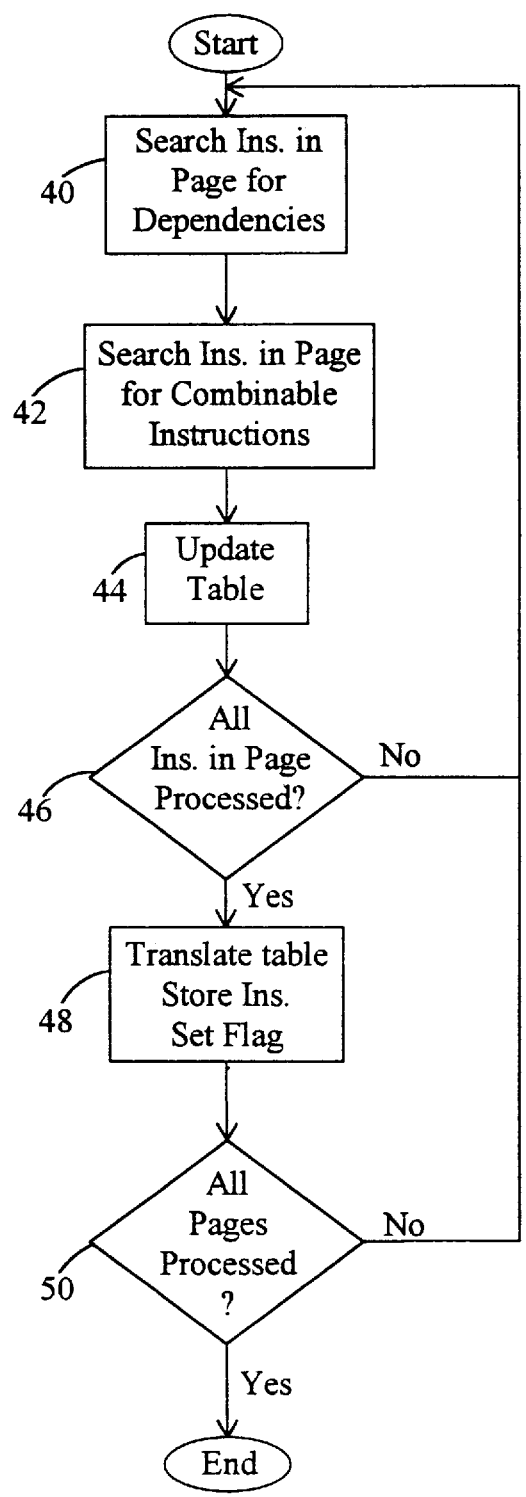
FIG. 3 is a flow chart showing the actions performed by one of the microprocessors shown in FIG. 2, according to one embodiment.

Turning now to FIG. 3, a flow chart showing actions performed by first microprocessor 12 according to one embodiment is shown. The flow chart includes steps 40, 42, 44, and 48. Additionally, the flow chart includes decision boxes 46 and 50.

As noted above, first microprocessor 12 performs the translation of an original computer program on a page by page basis. When first microprocessor 12 begins translating the original computer program, first microprocessor 12 preprocesses the instructions within a page. Steps 40, 42 and 44 and decision box 46 indicate the actions included in preprocessing a page according to the embodiment of FIG. 3. A table of instructions within the page is built, storing each instruction and the information generated in the preprocess stage. The table of instructions may then be translated into instructions in the instruction set employed by second microprocessor 14.

For each instruction in the page (the "current instruction"), steps 40, 42, and 44 are performed. First, the subsequent instructions in the page are scanned to determine if any of the subsequent instructions have dependencies upon the current instruction. The scan stops when a branch instruction is detected or when another instruction has a destination equal to the destination of the current instruction. Scanning is ended for branch instructions because a dependency beyond a branch may not be statically determinable. Determining whether or not an instruction subsequent to a branch instruction depends upon the current instruction includes determining the direction the branch instruction selects when the program is executed. Similarly, once another instruction stores a value to the destination of the current instruction, any subsequent instructions are dependent upon the other instruction.

If a dependency is detected upon the current instruction, first microprocessor 12 determines if the current instruction and the dependent instruction may be combined into a single operation within the instruction set employed by second microprocessor 14. For example, the ADSP 2171 is configured to perform a multiply-add instruction in which a pair of operands are multiplied and the product is added to a third operand. Therefore, if the current instruction is a multiply and the dependent instruction is an add, the instructions may be combined. First microprocessor 12 notes the position within the page of the dependent instruction which may be combined with the current instruction. Searching the subsequent instructions for dependencies is represented by step 40.

As used herein, a second instruction is dependent upon a first instruction prior to the second instruction if the first instruction produces a result which is used as an operand of the second instruction. The second instruction is said to have a "dependency" upon the first instruction.

In addition to searching for dependencies, other types of instruction operations may be combined in the instruction set of second microprocessor 14. For example, the ADSP 2171 is configured to perform an operation upon two operands, read new values from memory to be stored in the registers holding the two operands, and increment two other registers storing the addresses of the new values. Therefore, instructions which use registers as operands and subsequent instructions which read operands into those registers may be combined into a single operation. First microprocessor 12 notes the position in the page of such instructions. Instructions which are not dependent in the original computer program but which may be combined into a single operation within the instruction set employed by second microprocessor 14 are said to be "combinable". The step of searching for combinable instructions is shown in FIG. 3 as step 42. It is noted that steps 40 and 42 may be performed in parallel, such that the subsequent instructions within the page are traversed only once. It is further noted that first microprocessor 12 ends the search through subsequent instructions for similar reasons to ending the search performed in step 40 (i.e. detection of a branch instruction or a subsequent instruction which updates the destination of the current instruction).

In step 44, each instruction in the page is stored into a table of instructions by first microprocessor 12. The dependencies and combinable instructions which were noted in steps 40 and 42 are stored into the table along with the instruction. As represented by decision box 46, first microprocessor 12 determines if all instructions in the page have been preprocessed and placed into the table of instructions. If not, then first microprocessor 12 reads the next instruction and repeats steps 40, 42, and 44. If all instructions in the page have been processed, then first microprocessor 12 proceeds to step 48.

First microprocessor 12 translates the instructions in the table of instructions during step 48. Starting with the first instruction in the page, first microprocessor 12 creates equivalent instructions in the instruction set executed by second microprocessor 14. If one or more instructions are noted as dependent upon the instruction being translated or as combinable with the instruction being translated, those one or more instructions are translated concurrently into a single instruction in the instruction set employed by second microprocessor 14. Each equivalent instruction is stored into a designated storage location. In one embodiment, the equivalent instructions are stored in buffer 30. The equivalent instructions may be additionally stored into main memory 18, such that if the page of instructions is executed again at later time the instructions need not be retranslated. In another embodiment, the equivalent instructions are stored into main memory 18 and buffer 30 is not included.

Once the page of instructions has been translated and stored, first microprocessor 12 sets the valid indication with respect to the page. Second microprocessor 14 may then access and execute the page of equivalent instructions. Subsequent to setting the valid indication, first microprocessor 12 determines if all pages in the original computer program have been translated (decision box 50). First microprocessor 12 repeats steps 40 through 48 for any additional pages in the computer program. Once the entire original program has been translated, first microprocessor 12 has completed the translation task.

In embodiments of computer system 10 including buffer 30, step 50 involves a test to see if the alternate page of storage is available for storing a newly translated page. As discussed earlier, the valid indication 34 associated with the alternate page of storage 32 being reset indicates that the page of storage is available. It is noted that, although the previously described procedure details translating consecutive pages of a program, many programs do not execute consecutive pages. Instead, subroutine calls and other branching behavior may cause pages to be accessed in an essentially random order with respect to their storage in main memory 18. First microprocessor 12 may be configured to detect that second microprocessor 14 requires a particular page to be translated in order to continue instruction execution. Upon detection of such a requirement, first microprocessor 12 may translate that particular page out of order with respect to the consecutive pages being translated. It is further noted that consecutive pages may not be adjacent in memory. Instead, a page may be consecutive to another page if no pages of instructions are stored in memory addresses between the two pages. It is still further noted that the steps of detecting dependent and combinable instructions and the step of creating equivalent instructions may be performed in parallel. In other words, each instruction may be preprocessed and the equivalent instruction immediately created, as opposed to tabulating the instructions and translating from the table. For such an embodiment, the table of instructions may include simply an indication that the instruction has been combined with a prior instruction. First microprocessor 12 may then skip preprocessing and translating an instruction which has already been translated.

Figure 4:
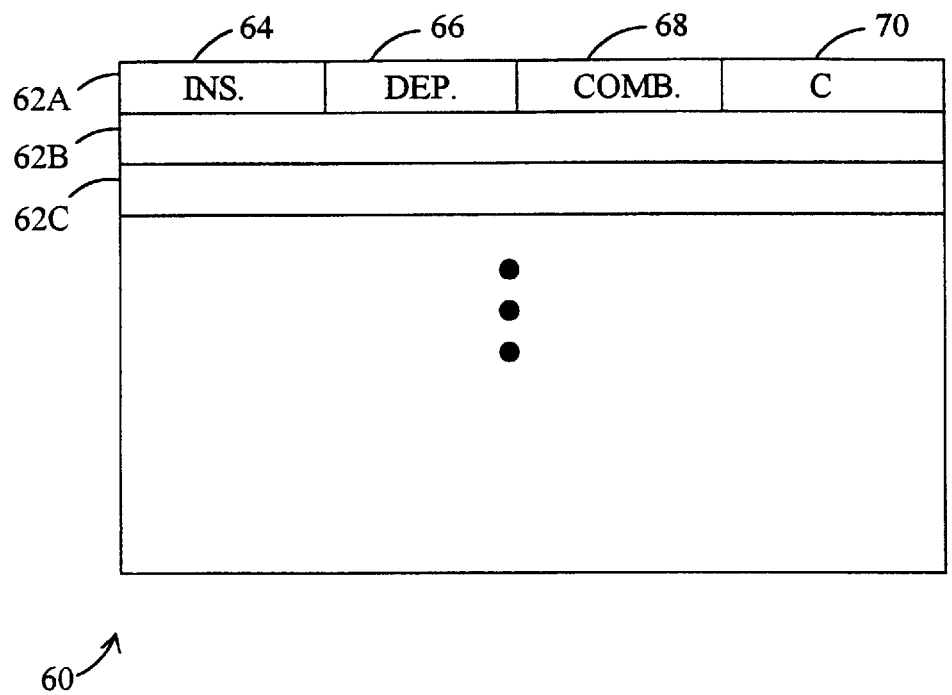
FIG. 4 is a table of instructions created while performing the actions shown in FIG. 3.

Turning now to FIG. 4, an embodiment of the table of instructions 60 formed by first microprocessor 12 during instruction preprocessing is shown. Table of instructions 60 includes a plurality of storage locations 62 (including storage locations 62A, 62B, and 62C shown in FIG. 4). Each storage location 62 includes an instruction field 64, a dependency field 66, a combine field 68, and a combined bit 70.

Instruction field 64 stores the instruction corresponding to the storage location 62. Instructions are stored in table of instructions 60 in program order, such that the instruction stored in storage location 62A is prior to the instruction stored in storage location 62B in program order. An instruction address locating the instruction within the page may also be stored in instruction field 64.

Dependency field 66 stores an indication of instructions subsequent to the instruction stored in the current storage location 62 which are dependent upon the instruction. In one embodiment, a number indicative of the storage location 62 which stores the subsequent instruction is stored in dependency field 66. Combine field 68 similarly stores and indication of instructions subsequent to the instruction stored in the current storage location 62. However, instructions indicated by combine field 68 are not dependent upon the current instruction. Instead, the instructions indicated by combine field 68 perform operations which second microprocessor 14 is configured to perform in parallel with operations defined by the current instruction. In one embodiment, combine field 68 stores a number indicative of the storage location 62 which stores the combinable instruction.

When first microprocessor 12 creates equivalent instructions in the instruction set of second microprocessor 14, first microprocessor 12 parses through table of instructions 60. If an instruction identified by dependency field 66 or combine field 68 is combined with an instruction stored in the corresponding storage location 62, first microprocessor 12 sets the combined bit 70 of the instructions identified by dependency field 66 or combine field 68. First microprocessor 12, when processing a storage location 62, checks the state of the combined bit 70. If the combined bit 70 is set, first microprocessor 12 skips the current instruction and begins processing the subsequent storage location 62. In this manner, first microprocessor 12 does not attempt to create an equivalent instruction for one of the identified instructions. The operation performed by the identified instructions is performed by the equivalent instruction previously created, and therefore should not be performed a second time.

In accordance with the above disclosure, a computer system has been disclosed. The computer system includes a first microprocessor configured to translate an original computer program into a translated computer program. A second microprocessor is configured to execute the translated computer program. Certain original computer programs may execute more efficiently in the translated instruction set, advantageously increasing performance. However, the cost associated with manually converting the original program to the translated instruction set is avoided through the operation of the first microprocessor.

Numerous variations and modifications will become apparent to those skilled in the art once the above disclosure is fully appreciated. It is intended that the following claims be interpreted to embrace all such variations and modifications.

What is claimed is:

1. A computer system, comprising:
    a first microprocessor configured to translate a first computer program coded in a first instruction set into a second computer program coded in a second instruction set different from said first instruction set, said first computer program being executable in said first microprocessor even without translation;
    a buffer coupled to said first microprocessor, wherein said buffer includes a first portion and a second portion, said first and second portions being configured to store translated instructions which comprise said second computer program; and
    a second microprocessor coupled to said buffer and configured to execute translated instructions from either said first portion or said second portion of said buffer;
    wherein said first portion is filled with translated instructions at the same time said second processor executes translated instructions stored in said second portion; and
    wherein said first microprocessor, said buffer, and said second microprocessor are integrated upon a common substrate.

2. The computer system of claim 1 wherein said translated instructions are stored by the first microprocessor within said first portion and said second portion in a ping-pong fashion.

3. The computer system of claim 2 wherein the second microprocessor fetches instructions for execution out of a portion of said buffer which is currently not being stored into by the first microprocessor.

4. The computer system of claim 1 wherein said first portion of said buffer includes a first indication which indicates a valid condition or an invalid condition, wherein said first microprocessor stores translated instructions into said first buffer portion only if said first indication indicate said invalid condition, wherein said first microprocessor sets the first indication to indicate said valid condition when said first microprocessor completes a cycle of storing translated instructions into said first portion of said buffer.

5. The computer system of claim 4 wherein said second microprocessor fetches translated instructions from said first portion of said buffer only if said first indication indicates said valid condition, said second microprocessor setting said first indication to indicate said invalid condition before said second microprocessor starts to fetch translated instruction from said first portion of said buffer.

6. The computer system as recited in claim 1 further comprising a main memory coupled to said first microprocessor, wherein said main memory is configured to store said first computer program, and wherein said first microprocessor is configured to fetch said first computer program from said main memory.

7. The computer system as recited in claim 6, wherein said first microprocessor is configured to store said second computer program into said main memory.

8. The computer system as recited in claim 7, wherein said second microprocessor is coupled to said main memory, and configured to read said second computer program from said main memory.

9. The computer system as recited in claim 1 wherein said first instruction set comprises the x86 instruction set.

10. The computer system as recited in claim 9 wherein said second instruction set comprises the ADSP 2171 instruction set.

11. A method for executing a first computer program coded in a first instruction set within a computer system, said computer system comprising a first microprocessor, a buffer, and a second microprocessor, said first computer program being executable in said first microprocessor even without translation, the method comprising:
    said first microprocessor translating said first computer program into a second computer program coded in a second instruction set different from the first instruction set;
    said first microprocessor storing translated instructions comprising said second computer program into a first portion and a second portion of said buffer in a ping-pong fashion;
    said second microprocessor fetching translated instructions for execution from a portion of said buffer which is not currently being stored to by the first microprocessor.

12. The method of claim 11 further comprising said second microprocessor executing said fetched translated instructions, wherein said executing and said translating are performed concurrently.

13. The method of claim 11 wherein said first microprocessor stores translated instructions into said first portion of said buffer only if a first indication associated with said first portion indicates an invalid condition, wherein said first microprocessor sets the first indication to indicate a valid condition upon completion of a cycle of storing translated instructions into said first portion of said buffer.

14. The method of claim 13 wherein said second microprocessor fetches translated instructions from said first portion of said buffer only if said first indication indicates a valid condition, wherein said second microprocessor sets said first indication to indicate an invalid condition upon detecting said first indication in said valid condition.

15. The method as recited in claim 11 wherein said translation comprises:

detecting a dependency between a first instruction and a second instruction within said first computer program, wherein said first instruction and said second instruction may be combined into a single instruction within said second instruction set; and combining said first instruction and said second instruction into said single instruction.

16. The method as recited in claim 11 wherein said translating comprises:

detecting a third instruction and a fourth instruction within said first computer program which may be combined into another instruction within said second instruction set; and combining said third instruction and said fourth instruction into said another instruction.

* * * * *